United States Patent Office 2,755,269
Patented July 17, 1956

2,755,269

PHENOL-ALDEHYDE TYPE ORGANOSILICON RESINS

Kenneth W. Moorhead, Midland, Mich., assignor to Dow Corning Corporation, Midland, Mich., a corporation of Michigan No Drawing. Application December 5, 1952, Serial No. 324,395

Claims priority, application Great Britain January 14, 1952

3 Claims. (Cl. 260—42)

This invention relates to organosilicon modified phenol-aldehyde resins comprising the condensation product of the reaction product of an organosilane or a partially hydrolyzed organosiloxane and an hydroxyphenyl compound with an aldehyde.

The well-known phenol-aldehyde type resins of commerce are excellent for those applications in which a thermosetting, infusible material is desired. They are particularly adaptable for the formation of moldings which do not soften when heated and which are unaffected by solvents. It is well recognized that these phenol-aldehydes do not withstand temperatures of 150° C. for any substantial length of time.

It is the primary object of this invention to produce resinous materials which retain the favorable physical properties of phenol-aldehyde type resins and at the same time exhibit increased thermostability.

The resins of this invention can be more specifically defined as the condensation products of the reaction product of (1) an organosilicon compound of the average general formula

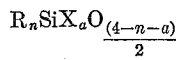

where R is a monovalent hydrocarbon radical free of aliphatic unsaturation, $n$ has an average value of from 1 to 3 inclusive, X is a substituent selected from the group consisting of alkoxy radicals, aryloxy radicals, chlorine, and bromine, and $a$ has an average value of from 0.2 to 3 inclusive, the sum of $n+a$ being not greater than 4, and (2) an hydroxyphenyl compound selected from the group consisting of resorcinol, p,p'-bis-hydroxyphenyldimethylmethane, phenol, cresylic acid, monoalkyl substituted phenol, and monoaryl substituted phenol, with (3) an aldehyde, in proportions such that the ratio of silicon linked X substituents to OH groups in the hydroxyphenyl compound ranges from 1:10 to 10:1, and the molar ratio of aldehyde to hydroxyphenyl compound ranges from 0.1:1 to 6:1.

The organosilicon compound $R_nSiX_aO_{(4-n-a)/2}$ is first reacted with the hydroxyphenyl compound, and then the resulting reaction product is reacted with an aldehyde. Additional aldehyde can be added to the reaction product of the three reactants, if desired, after the initial condensation has been completed. In general, the best resins have been obtained from systems in which the defined organosilicon reactant is present in an amount of at least 10 per cent by weight based on the total weight of the reactants.

More specifically, the above described method comprises reacting, in liquid phase and at a temperature of at least 50° C., an aldehyde with the reaction production of (1) an organosilicon compound of the average general formula $R_nSiY_aO_{(4-n-a)/2}$ with (2) an hydroxyphenyl compound selected from the group consisting of resorcinol, p,p'-bis-hydroxyphenyldimethylmethane, phenol, cresylic acid, monoalkyl substituted phenol, and monoaryl substituted phenol. In the above formula, R is a monovalent hydrocarbon radical free of aliphatic unsaturation, $n$ has an average value of from 1 to 3 inclusive, Y is chlorine, bromine, or an alkoxy radical, and $a$ has an average value of from 0.2 to 3 inclusive, the sum of $n$ plus $a$ being no greater than 4. The organosilicon compound (1) and the hydroxyphenyl compound (2) are employed in an amount such that the ratio of silicon linked Y substituents to phenyl linked OH groups ranges from 1:10 to 10:1. The aldehyde is employed in an amount such that the molar ratio of aldehyde to hydroxyphenyl compound ranges from 0.1:1 to 6:1.

The above reaction may be regarded as either a two-step process or a one-step process. As a two-step process, the silane or siloxane is first reacted with the hydroxyphenyl compound. This reaction may be carried out at temperatures ranging from below 30° C. up to 250° C. The precise temperature depends somewhat upon the nature of the Y radicals. For example, when halosilanes are employed, the reaction is preferably carried out at temperatures from below 30° C. to 100° C. In those cases in which the Y is an alkoxy radical, it is preferable to carry out the reaction at temperatures from 60° C. to 200° C. In any event, the reaction is continued until no more of the by-produced halogen acid or alcohol can be removed. The resulting material is a condensation product of the silane or siloxane and the hydroxyphenyl compound. It is formed by the reaction of the phenyl hydroxyl groups with the silane Y radicals to split out HY and to form an SiOC linkage.

The intermediate condensation product can be considered as the product of the first step of a two-step process. It is obvious, however, that this condensation product may at some time be a commercially available material, and the invention includes starting with such a condensation product as one of the reactants of a one-step process.

The intermediate condensation product is then reacted with an aldehyde, the reaction generally being carried out at temperatures ranging from 50° C. to 200° C. The preferred form of the aldehyde is as formaldehyde. The invention includes the use of aldehyde yielding substances, however, such as paraformaldehyde and metaldehyde. Other aldehydes which are conventionally employed in the production of phenol-aldehyde type resins are also included within the scope of this invention. Examples of such aldehydes are acetaldehyde and furfural. The preferred aldehyde is formaldehyde, which can be added in the gaseous state or as a solution in a low molecular weight alcohol such as ethanol, propanol, or butanol.

The reaction of the aldehyde is facilitated by the presence of either an acid or alkaline catalyst. Examples of preferred catalysts are hydrochloric acid, oxalic acid, aqueous KOH or NaOH, hexamethylenetetramine, and triethanolamine.

The organosilicon compounds employed in this method are either monomeric silanes of the general formula $R_nSiY_{4-n}$ in which R is preferably a saturated aliphatic hydrocarbon radical or an aryl radical, $n$ has a value from 1 to 3, and Y is chlorine, bromine, or alkoxy, or the organosilicon compound may be a partial hydrolyzate of the above silanes. These partial hydrolyzates are soluble polymeric materials in which the silicon atoms are linked together by oxygen atoms and in which all of the silicon atoms have attached thereto at least one of the above R groups and in which some of the silicon atoms have Y groups, preferably alkoxy groups, attached thereto. The average number of Y groups in the partial hydrolyzate can obviously vary from 0.2 Y groups per silicon up to, but not including, 3 Y groups per silicon. The molecular weight of these partial hydrolyzates will vary depending upon the Y group content. The lower the Y group content, the higher is the molecular weight of the siloxane. Mixtures of the defined silanes or siloxanes can, of course, be employed.

The monomeric silanes employed in this invention are well known, while the partial hydrolyzate may be prepared from such monomeric silanes by one of several methods. For example, an alkoxy silane may be reacted with less than the theoretical amount of water so that there is only partial removal of the alkoxy groups. The preferred method, however, is that of reacting a chlorosilane of the formula $R_nSiCl_{4-n}$ where R is as above defined, with less than the theoretical amount of an alcohol and thereafter reacting the chloroalkoxysilane with sufficient water to remove all of the halogen. Since chlorine is more readily hydrolyzed from silicon than alkoxy groups, very little of the latter will be removed during hydrolysis.

Specific examples of silanes which are operative in this invention are methyltrichlorosilane, octadecylmethyldichlorosilane, triphenylchlorosilane, tolylmethyldichlorosilane, dimethyldibromosilane, cyclohexyltrichlorosilane, phenylmethyldiethoxysilane, phenyltrimethoxysilane, butylmethyldiisopropoxysilane, trimethylstearyloxysilane, and diphenyldihexyloxysilane, together with partial hydrolyzates of the above silanes. As stated previously, the partial hydrolyzates should contain an average of at least 0.2 Y groups per Si atom. Whereas the alkoxy groups employed herein may be of any size, it is preferred that they contain less than 7 carbon atoms. The most preferred organosilicon compounds are those which are methyl and/or phenyl substituted materials.

The hydroxyphenyl compounds employed in this invention are resorcinol, p,p'-bis-hydroxyphenyldimethylmethane

phenol, cresylic acid, monoalkyl substituted phenols, and monoaryl substituted phenols. The invention includes the use of such compounds either singly or as mixtures, and all of the various isomers of the substituted phenols are applicable. Examples of specific substituted phenols which have been found preferable are these: cresol, cresylic acid (a crude mixture of the ortho, meta, and para isomers of cresol plus small amounts of phenol, xylenols, and higher boiling constituents), ortho and para phenylphenol, ortho and para isopropylphenol, para-t-butylphenol, and para t-amylphenol.

The reaction between the organosilicon-hydroxyphenyl reaction product and the aldehyde is presumed to take place by the formation of methylene bridges in the positions ortho and para to the substituent groups. The reaction is initiated by heating at 50° C. or above and is continued until a homogeneous product is obtained. During the reaction it is often found desirable to dilute the reactants with solvents such as cyclohexanone, butanol, or xylene, in order to prevent premature gelation. Such dilution is particularly desirable in systems which contain relatively high amounts of the aldehyde.

As stated previously, the aldehyde is employed in an amount such that the molar ratio of aldehyde to hydroxyphenyl compound ranges from 0.1:1 to 6:1. Preferably a range of from 0.3:1 to 5:1 is employed. It is to be understood that the molar ratio of aldehyde referred to is based upon the monomeric units of any polymeric aldehyde which is employed. Thus, for purposes of calculating the defined ratio, the compound paraformaldehyde, $(CH_2O)_x$, is considered as having a molecular weight of only the $CH_2O$ unit, i. e., a molecular weight of 30.

The amount of aldehyde employed will, of course, vary with the type of hydroxyphenyl compound which has been used to form the intermediate condensation product, and with the type of resin desired. In general, relatively greater amounts of aldehyde tend to produce resins which are harder, but more brittle, and which have a more thermosetting nature.

The compound p,p'-bis-hydroxyphenyldimethylmethane has the maximum theoretical ability of the defined compounds to react with an aldehyde. One mol of this compound can theoretically react with 4 mols of an aldehyde on the theory that only the positions ortho and para to the hydroxy group of an hydroxyphenyl compound are reactive. Thus, the process of this invention can employ up to a 50 per cent excess of aldehyde in this instance. An ortho or para substituted phenol, in comparison, can only react with 2 mols of the aldehyde, and thus the defined maximum ratio represents 3 times the theoretical amount for such compounds. Actually, there is no particular advantage in using any more than a 50 per cent excess of aldehyde in any of the defined systems, and ordinarily the amount of aldehyde is preferably kept down to the theoretical amount or less.

In defining the aldehyde to hydroxyphenyl ratio, it is to be understood that there are not necessarily any hydroxyphenyl constituents per se present in the system at the time of the aldehyde addition. A portion, if not all, of the "hydroxyphenyl" in question will, of course, be present as the corresponding aryloxy radical attached to a silicon atom in the intermediate condensation product. Thus, the term "hydroxyphenyl" is meant to be the equivalent of the corresponding aryloxy radical which is derived therefrom.

It will be noted that the organosilicon reactants employed in this invention have been defined both as $$R_nSiX_aO_{(4-n-a)/2}$$

and as 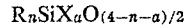 $R_nSiY_aO_{(4-n-a)/2}$. These reactants are the same except that X can be aryloxy if desired, whereas Y is only chlorine, bromine, or alkoxy. The preferred method described above reacts the defined silane or siloxane containing Y substituents with the hydroxyphenyl compound as the first step in the reaction. It is obvious that this step produces silanes or siloxanes which contain X substituents where X is an aryloxy radical corresponding to the hydroxyphenyl compound. Thus this invention includes within its scope processes in which the aryloxy substituted organosilane is an intermediate reaction product and processes in which the aryloxy silane is an initial reactant.

When an aryloxysilane is used as an initial reactant, it is not necessary to add any additional hydroxyphenyl compound prior to reacting the silane with the aldehyde. Such additional hydroxyphenyl compound can be added if desired, however, as long as the total amount present (both as the free hydroxyphenyl compound and as aryloxy substituents on silicon) does not exceed the defined limits. The addition of an extra amount of hydroxyphenyl compound will of course result in a resin which is comparatively less rich in the organosilicon constituents.

As has been stated previously in the specification, when alkoxy silanes or siloxanes are used in this invention, it is preferred that the alkoxy radicals contain less than 7 carbon atoms. The aryloxy substituted organosilicon compounds are those in which the aryloxy radical can either be substituted or unsubstituted by other organic substituents. If a substituted aryloxy radical is present, it should of course have at least one unsubstituted ortho or para position on the benzene ring to provide a place for the formation of methylene linkages in such positions. Preferably any substituted aryloxy radical present is a monoalkyl substituted radical such as an o-, m-, or p-cresoxy radical, or a monoaryl substituted radical such as the various isomeric phenylphenoxy radicals.

The resins produced as above described may be thermoset by continued heating, and the thermoset materials are hard and heat stable. The resins are excellent for use as molding compositions either alone or in connection with fillers such as glass cloth, asbestos and other inorganic materials.

It is often desirable to add an additional quantity of aldehyde to the resin prior to molding. This can be done, for example, by mixing paraformaldehyde with the resin in any convenient manner.

The resins of this invention can also be used as impregnating and laminating resins, and have been found to produce exceptionally hard, thermally stable laminates. These resins can also be used in solution in appropriate solvents as varnishes, and as ingredients in varnishes of the spar varnish type.

The thermostability of the materials of this invention is indicated by their low weight loss and resistance to cracking when subjected to temperatures of 250° C.

The following examples are illustrative only.

Example 1

A mixture of 110 grams of resorcinol and 210 grams of phenylmethyldiethoxysilane was heated at 110° C. Ethanol began to distill. Heating was continued at 200° C. while carbon dioxide was passed through the reaction mixture. About 85 per cent of the theoretical amount of alcohol was removed. 20 grams of the above reaction product was mixed with 6 grams of formaldehyde which was dissolved in normal-propanol. 2 cc. of concentrated HCl was then added and the material was heated at 50° to 60° C. The viscosity began to rise so that it was necessary to dilute from time to time to prevent gelation. Heating was continued until the material thermoset to a resinous material.

Example 2

2 gram mols of phenylmethyldiethoxysilane was reacted with 1 gram mol of p,p'-bis-hydroxyphenyldimethylmethane by heating a mixture of the two at temperatures up to 200° C. until approximately 85 per cent of theoretical amount of ethyl alcohol was removed. The resulting product was then mixed with 5 mols of formaldehyde dissolved in normal-propyl alcohol and 5 drops of concentrated aqueous KOH. The material was heated at temperatures up to 165° C. and from time to time cyclohexanone was added to prevent gelation. During the reaction, drops were removed and placed on a metal plate. Originally, these drops were clouded, indicating a two-phase system but as the reaction progressed they became clear showing that a homogeneous product was obtained. At that point the reaction was stopped. The resulting material was a thermosetting resin which exhibited good thermal stability.

A sample of the resin was placed in an aluminum dish and heated 120 hours at 250° C. whereupon the weight loss was 6 per cent.

Example 3

165 grams of resorcinol was mixed with 210 grams of phenylmethyldiethoxysilane and the mixture was heated at from 114° C. to 227° C. as $CO_2$ was passed over the mixture. Heating was continued until no more ethanol evolved. The product was cooled and 115.5 grams of it was mixed with 19.5 grams of formaldehyde in methanol solution and 8 drops of concentrated aqueous NaOH. The mixture was warmed whereupon reaction began and continued until a resinous material was obtained.

Example 4

114 grams of p,p'-bis-hydroxyphenyldimethylmethane was mixed with 246 grams of a partially hydrolyzed isopropoxy siloxane containing 28 per cent by weight silicon bonded isopropoxy groups in which siloxane there were 70 mol per cent phenylmethylsiloxane units and 30 mol per cent monophenylsiloxane units. 2 ccs. of concentrated HCl was added to the mixture which was then heated up to 210° C. until no more isopropanol was evolved.

120 grams of this product was reacted with 31.5 grams of formaldehyde dissolved in methanol, at 97° C. for 1 day. A resinous material was obtained.

Example 5

360 grams of phenyldimethylethoxysilane was reacted with 110 grams of resorcinol at 90° C. to 130° C. until no more ethanol was removed. 27 grams of the product was reacted with 3 grams of paraformaldehyde in the presence of 1 drop of concentrated HCl by heating at about 100° C. A resinous material was obtained.

Example 6

Resinous materials are obtained when 1 gram mol of phenol is warmed with 0.3 gram mol of butyltrichlorosilane until no more HCl is evolved and the reaction product is thereafter reacted with 5 gram mols of formaldehyde at a temperature of 175° C.

Example 7

A mixture of 229 grams of phenylmethyldi-o-phenylphenoxysilane, 45 grams paraformaldehyde, and 11 grams triethanolamine was gradually heated up to 100° C., at which temperature the mixture became homogeneous. The temperature was then increased to 200° C. for one hour and the system then evacuated to remove volatiles. A resinous product was obtained which cooled to a non-tacky solid resin.

Example 8

A resinous material was prepared by the general procedure of Example 7, employing a mixture of 167 grams phenylmethyldi-m-cresoxysilane, 15 grams paraformaldehyde, and 3.7 grams triethanolamine.

Example 9

A resin was prepared by repeating the method of Example 8, but employing diphenyldi-o-cresoxysilane in place of the phenylmethyl substituted silane.

Example 10

Resins comparable to those prepared in Example 7 were prepared by employing the general procedure of Example 7, using ortho- or para-isopropyl-phenoxy-, para-t-butyl-phenoxy-, para-t-amylphenoxy-, or a mixture of ortho-, meta-, and para-cresoxy substituted phenylmethylsilanes in place of the ortho-phenylphenoxy substituted silane of Example 7.

Example 11

A mixture of 167 grams phenylmethyldi-o-cresoxysilane, 36 grams paraformaldehyde, and 3.5 grams hexamethylenetetramine was heated as in Example 7 to 200° C. for one hour. Upon cooling, the resulting resin was powdered and mixed with an additional 45 grams of paraformaldehyde. Hexamethylenetetramine was added in an amount equal to 6 per cent by weight based on the weight of the mixture and the entire mix was molded at 175° C. under a pressure of about 10 p. s. i. The resulting molded product was very hard and thermally stable.

Example 12

A mixture of 115.2 grams phenyltriphenoxysilane, 13.5 grams paraformaldehyde, and 5.1 grams triethanolamine was heated as per Example 7 to produce a resinous thermo-setting material.

Example 13

Dimethyldicresoxysilane was prepared by the reaction of dimethyldichlorosilane with cresylic acid. A mixture of 272 grams (1 mol) of the reaction product, 2 mols of formaldehyde as a 40 per cent solution in butanol, and 16.9 grams of triethanolamine was gradually heated to 138° C. The mixture was heated at this temperature for one hour while butanol and evolved water were distilled off. A thermosetting resinous product was obtained.

Example 14

Dimethyldicresoxysilane was prepared by the reaction of dimethyldichlorosilane with cresylic acid. The crude reaction product was distilled and a portion boiling from 179° to 191° C. at a pressure of 13 mm. mercury was set aside for the following resin preparation. 50 parts by weight of the above distilled product was mixed with 50 parts by weight of 2,4-dimethylol-o-cresol. The mixture was placed in an aluminum foil cup and heated in an oven at 175° C. for 6 hours, after which time it was found to be a thermoset flexible resin. After heating this resin for 7 days at 250° C. the resin was found to be still flexible and showed no signs of thermal degradation.

That which is claimed is:

1. The process which comprises reacting, in liquid phase and at a temperature of at least 50° C., an aldehyde with the reaction product of (1) an organosilicon compound of the average general formula $R_nSiY_aO_{(4-n-a)/2}$ where R is a monovalent hydrocarbon radical free of aliphatic unsaturation, $n$ has an average value of from 1 to 3 inclusive, Y is a substituent selected from the group consisting of alkoxy radicals, chlorine, and bromine, and $a$ has an average value of from 0.2 to 3 inclusive, the sum of $n+a$ being not greater than 4, with (2) an hydroxyphenyl compound selected from the group consisting of resorcinol, p,p'-bis-hydroxyphenyldimethylmethane, phenol, cresylic acid, monoalkyl substituted phenol, and monoaryl substituted phenol, (1) and (2) being employed in an amount such that the ratio of silicon linked Y substituents to phenyl linked OH ranges from 1:10 to 10:1, and the aldehyde being employed in amount such that the molar ratio of aldehyde to hydroxyphenyl compound ranges from 0.1:1 to 6:1.

2. The process in accordance with claim 1 in which the reaction of the aldehyde with the reaction product of the organosilicon compound and the hydroxyphenyl compound is carried out in the presence of a catalyst for the reaction and in which the ratio of aldehyde to hydroxyphenyl compound ranges from 0.3:1 to 5:1.

3. The process of claim 1 in which the aldehyde is selected from the group consisting of formaldehyde and paraformaldehyde and in which R represents a radical selected from the group consisting of methyl and phenyl radicals.

References Cited in the file of this patent

UNITED STATES PATENTS

| | | |
|---|---|---|
| 2,182,208 | Nason | Dec. 5, 1939 |
| 2,611,776 | Speier | Sept. 23, 1952 |
| 2,611,777 | Speier | Sept. 23, 1952 |